US008607315B2

(12) United States Patent
Jou et al.

(10) Patent No.: US 8,607,315 B2
(45) Date of Patent: *Dec. 10, 2013

(54) DYNAMIC AUTHENTICATION IN SECURED WIRELESS NETWORKS

(75) Inventors: Tyan-Shu Jou, Fremont, CA (US); Ming Sheu, San Jose, CA (US); Bo-Chieh Yang, San Jose, CA (US); Tian-Yuan Lin, Fremont, CA (US); Ted Tsei Kuo, Palo Alto, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,997

(22) Filed: Aug. 21, 2012

(65) Prior Publication Data
US 2012/0317625 A1 Dec. 13, 2012

Related U.S. Application Data

(63) Continuation of application No. 12/845,089, filed on Jul. 28, 2010, now Pat. No. 8,272,036, which is a continuation of application No. 11/788,371, filed on Apr. 18, 2007, now Pat. No. 7,788,703.

(60) Provisional application No. 60/794,625, filed on Apr. 24, 2006, provisional application No. 60/796,845, filed on May 2, 2006.

(51) Int. Cl.
G06F 17/30 (2006.01)
(52) U.S. Cl.
USPC ........ 726/4; 726/2; 726/3; 380/255; 380/270; 380/282; 713/171

(58) Field of Classification Search
USPC ............ 726/2–4; 380/255, 270, 282; 713/171
See application file for complete search history.

(56) References Cited

U.S. PATENT DOCUMENTS

| | | | |
|---|---|---|---|
| 4,176,356 A | 11/1979 | Foster | |
| 4,193,077 A | 3/1980 | Greenberg et al. | |
| 4,253,193 A | 2/1981 | Kennard | |
| 4,305,052 A | 12/1981 | Baril | |
| 4,513,412 A | 4/1985 | Cox | |
| 4,814,777 A | 3/1989 | Monser | |
| 5,097,484 A | 3/1992 | Akaiwa | |

(Continued)

FOREIGN PATENT DOCUMENTS

| | | |
|---|---|---|
| CN | 1708162 | 12/2005 |
| CN | 1316862 | 10/2011 |

(Continued)

OTHER PUBLICATIONS

PCT Application No. PCT/US2006/045893, International Search Report and Written Opinion Sep. 25, 2007.

(Continued)

*Primary Examiner* — Thanhnga B Truong
(74) *Attorney, Agent, or Firm* — Lewis Roca Rothgerber LLP

(57) ABSTRACT

Systems and methods for authentication using paired dynamic secrets in secured wireless networks are provided. Each authenticated user is assigned a random secret generated so as to be unique to the user. The secret is associated with a wireless interface belonging to the user, so that no other wireless interface may use the same secret to access the network. The secret may be updated either periodically or at the request of a network administrator, and reauthentication of the wireless network may be required.

20 Claims, 4 Drawing Sheets

(56) References Cited

U.S. PATENT DOCUMENTS

| | | |
|---|---|---|
| 5,173,711 A | 12/1992 | Takeuchi |
| 5,203,010 A | 4/1993 | Felix |
| 5,220,340 A | 6/1993 | Shafai |
| 5,373,548 A | 12/1994 | McCarthy |
| 5,507,035 A | 4/1996 | Bantz |
| 5,559,800 A | 9/1996 | Mousseau |
| 5,754,145 A | 5/1998 | Evans |
| 5,767,809 A | 6/1998 | Chuang |
| 5,802,312 A | 9/1998 | Lazaridis |
| 5,964,830 A | 10/1999 | Durett |
| 6,034,638 A | 3/2000 | Thiel |
| 6,094,177 A | 7/2000 | Yamamoto |
| 6,266,528 B1 | 7/2001 | Farzaneh |
| 6,292,153 B1 | 9/2001 | Aiello |
| 6,307,524 B1 | 10/2001 | Britain |
| 6,317,599 B1 | 11/2001 | Rappaport |
| 6,326,922 B1 | 12/2001 | Hegendoerfer |
| 6,337,628 B2 | 1/2002 | Campana |
| 6,337,668 B1 | 1/2002 | Ito |
| 6,339,404 B1 | 1/2002 | Johnson |
| 6,345,043 B1 | 2/2002 | Hsu |
| 6,356,242 B1 | 3/2002 | Ploussios |
| 6,356,243 B1 | 3/2002 | Schneider |
| 6,356,905 B1 | 3/2002 | Gershman |
| 6,377,227 B1 | 4/2002 | Zhu |
| 6,392,610 B1 | 5/2002 | Braun |
| 6,404,386 B1 | 6/2002 | Proctor |
| 6,407,719 B1 | 6/2002 | Ohira |
| 6,442,507 B1 | 8/2002 | Skidmore |
| 6,445,688 B1 | 9/2002 | Garces |
| 6,493,679 B1 | 12/2002 | Rappaport |
| 6,498,589 B1 | 12/2002 | Horii |
| 6,499,006 B1 | 12/2002 | Rappaport |
| 6,507,321 B2 | 1/2003 | Oberschmidt |
| 6,625,454 B1 | 9/2003 | Rappaport |
| 6,674,459 B2 | 1/2004 | Ben-Shachar |
| 6,701,522 B1 | 3/2004 | Rubin |
| 6,725,281 B1 | 4/2004 | Zintel |
| 6,753,814 B2 | 6/2004 | Killen |
| 6,762,723 B2 | 7/2004 | Nallo |
| 6,772,331 B1 | 8/2004 | Hind et al. |
| 6,779,004 B1 | 8/2004 | Zintel |
| 6,807,577 B1 | 10/2004 | Gillespie |
| 6,819,287 B2 | 11/2004 | Sullivan |
| 6,876,280 B2 | 4/2005 | Nakano |
| 6,888,504 B2 | 5/2005 | Chiang |
| 6,888,893 B2 | 5/2005 | Li |
| 6,892,230 B1 | 5/2005 | Gu |
| 6,906,678 B2 | 6/2005 | Chen |
| 6,910,068 B2 | 6/2005 | Zintel |
| 6,924,768 B2 | 8/2005 | Wu |
| 6,931,429 B2 | 8/2005 | Gouge |
| 6,941,143 B2 | 9/2005 | Mathur |
| 6,947,727 B1 | 9/2005 | Brynielsson |
| 6,950,019 B2 | 9/2005 | Bellone |
| 6,950,523 B1 | 9/2005 | Brickell |
| 6,961,028 B2 | 11/2005 | Joy |
| 6,973,622 B1 | 12/2005 | Rappaport |
| 6,975,834 B1 | 12/2005 | Forster |
| 7,034,770 B2 | 4/2006 | Yang |
| 7,043,277 B1 | 5/2006 | Pfister |
| 7,043,633 B1 | 5/2006 | Fink et al. |
| 7,050,809 B2 | 5/2006 | Lim |
| 7,064,717 B2 | 6/2006 | Kaluzni |
| 7,085,814 B1 | 8/2006 | Ghandi |
| 7,089,307 B2 | 8/2006 | Zintel |
| 7,127,234 B2 | 10/2006 | Ishii |
| 7,130,895 B2 | 10/2006 | Zintel |
| 7,171,475 B2 | 1/2007 | Weisman |
| 7,181,620 B1 | 2/2007 | Hur |
| 7,197,297 B2 | 3/2007 | Myles |
| 7,234,063 B1 | 6/2007 | Baugher |
| 7,234,156 B2 | 6/2007 | French et al. |
| 7,421,578 B1 | 9/2008 | Huang et al. |
| 7,477,894 B1 | 1/2009 | Sinha |
| 7,505,434 B1 | 3/2009 | Backes |
| 7,562,385 B2 | 7/2009 | Thione et al. |
| 7,565,529 B2 | 7/2009 | Beck |
| 7,599,380 B2 | 10/2009 | Whitten |
| 7,669,232 B2 | 2/2010 | Jou |
| 7,722,502 B2 | 5/2010 | Holkkola |
| 7,788,703 B2 | 8/2010 | Jou |
| 7,966,497 B2 | 6/2011 | Gantman et al. |
| 8,005,459 B2 | 8/2011 | Balsillie |
| 8,009,644 B2 | 8/2011 | Kuo |
| 8,091,120 B2 | 1/2012 | Perrella et al. |
| 8,272,036 B2 | 9/2012 | Jou |
| 2002/0009199 A1 | 1/2002 | Ala-Laurila et al. |
| 2002/0022483 A1 | 2/2002 | Thompson et al. |
| 2002/0031130 A1 | 3/2002 | Tsuchiya |
| 2002/0047800 A1 | 4/2002 | Proctor |
| 2002/0080767 A1 | 6/2002 | Lee |
| 2002/0084942 A1 | 7/2002 | Tsai |
| 2002/0105471 A1 | 8/2002 | Kojima |
| 2002/0112058 A1 | 8/2002 | Weisman |
| 2002/0158798 A1 | 10/2002 | Chang |
| 2002/0169966 A1 | 11/2002 | Nyman |
| 2002/0170064 A1 | 11/2002 | Monroe |
| 2003/0026240 A1 | 2/2003 | Eyuboglu |
| 2003/0030588 A1 | 2/2003 | Kalis |
| 2003/0063591 A1 | 4/2003 | Leung |
| 2003/0122714 A1 | 7/2003 | Wannagot |
| 2003/0156558 A1 | 8/2003 | Cromer et al. |
| 2003/0162533 A1 | 8/2003 | Moles |
| 2003/0169330 A1 | 9/2003 | Ben-Shachar |
| 2003/0184490 A1 | 10/2003 | Raiman |
| 2003/0189514 A1 | 10/2003 | Miyano |
| 2003/0189521 A1 | 10/2003 | Yamamoto |
| 2003/0189523 A1 | 10/2003 | Ojantakanen |
| 2003/0191935 A1 | 10/2003 | Ferguson |
| 2003/0196084 A1 | 10/2003 | Okereke |
| 2003/0202486 A1 | 10/2003 | Anton et al. |
| 2003/0210207 A1 | 11/2003 | Suh |
| 2003/0227414 A1 | 12/2003 | Saliga |
| 2004/0014432 A1 | 1/2004 | Boyle |
| 2004/0017310 A1 | 1/2004 | Vargas-Hurlston et al. |
| 2004/0017860 A1 | 1/2004 | Liu |
| 2004/0027291 A1 | 2/2004 | Zhang |
| 2004/0027304 A1 | 2/2004 | Chiang |
| 2004/0032378 A1 | 2/2004 | Volman |
| 2004/0036651 A1 | 2/2004 | Toda |
| 2004/0036654 A1 | 2/2004 | Hsieh |
| 2004/0041732 A1 | 3/2004 | Aikawa |
| 2004/0048593 A1 | 3/2004 | Sano |
| 2004/0058690 A1 | 3/2004 | Ratzel |
| 2004/0061653 A1 | 4/2004 | Webb |
| 2004/0070543 A1 | 4/2004 | Masaki |
| 2004/0073786 A1 | 4/2004 | O'Neill |
| 2004/0080455 A1 | 4/2004 | Lee |
| 2004/0095278 A1 | 5/2004 | Kanemoto |
| 2004/0097217 A1 | 5/2004 | McClain |
| 2004/0114535 A1 | 6/2004 | Hoffmann |
| 2004/0121749 A1 | 6/2004 | Cui et al. |
| 2004/0125777 A1 | 7/2004 | Doyle |
| 2004/0141617 A1 | 7/2004 | Volpano |
| 2004/0190477 A1 | 9/2004 | Olson |
| 2004/0203593 A1 | 10/2004 | Whelan |
| 2004/0214570 A1 | 10/2004 | Zhang |
| 2004/0214572 A1 | 10/2004 | Thompson et al. |
| 2004/0260800 A1 | 12/2004 | Gu |
| 2005/0022210 A1 | 1/2005 | Zintel |
| 2005/0041739 A1 | 2/2005 | Li |
| 2005/0042988 A1 | 2/2005 | Hoek |
| 2005/0074018 A1 | 4/2005 | Zintel |
| 2005/0097503 A1 | 5/2005 | Zintel |
| 2005/0100166 A1 | 5/2005 | Smetters |
| 2005/0135480 A1 | 6/2005 | Li |
| 2005/0138137 A1 | 6/2005 | Encarnacion |
| 2005/0138193 A1 | 6/2005 | Encarnacion |
| 2005/0152305 A1 | 7/2005 | Ji et al. |
| 2005/0165953 A1 | 7/2005 | Oba et al. |
| 2005/0180381 A1 | 8/2005 | Retzer |
| 2005/0188193 A1 | 8/2005 | Kuehnel |
| 2005/0220048 A1 | 10/2005 | Lee et al. |

(56) References Cited

U.S. PATENT DOCUMENTS

| | | |
|---|---|---|
| 2005/0228874 A1 | 10/2005 | Edgett |
| 2005/0240665 A1 | 10/2005 | Gu |
| 2005/0250472 A1 | 11/2005 | Silvester |
| 2005/0261970 A1 | 11/2005 | Vucina et al. |
| 2005/0267935 A1 | 12/2005 | Gandhi |
| 2005/0268107 A1 | 12/2005 | Harris |
| 2006/0007897 A1 | 1/2006 | Ishii |
| 2006/0046730 A1 | 3/2006 | Briancon et al. |
| 2006/0052085 A1 | 3/2006 | Gregrio Rodriguez et al. |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng |
| 2006/0123124 A1 | 6/2006 | Weisman |
| 2006/0123125 A1 | 6/2006 | Weisman |
| 2006/0123455 A1 | 6/2006 | Pai |
| 2006/0133405 A1 | 6/2006 | Fee |
| 2006/0165103 A1 | 7/2006 | Trudeau et al. |
| 2006/0168159 A1 | 7/2006 | Weisman |
| 2006/0184660 A1 | 8/2006 | Rao |
| 2006/0184661 A1 | 8/2006 | Weisman |
| 2006/0184693 A1 | 8/2006 | Rao |
| 2006/0189298 A1 | 8/2006 | Marcelli |
| 2006/0223527 A1 | 10/2006 | Lee et al. |
| 2006/0224690 A1 | 10/2006 | Falkenburg |
| 2006/0225107 A1 | 10/2006 | Seetharaman |
| 2006/0227761 A1 | 10/2006 | Scott |
| 2006/0239369 A1 | 10/2006 | Lee |
| 2006/0291434 A1 | 12/2006 | Gu |
| 2007/0027622 A1 | 2/2007 | Cleron |
| 2007/0047449 A1 | 3/2007 | Berger et al. |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier |
| 2007/0189537 A1 | 8/2007 | Zhang et al. |
| 2007/0199053 A1 | 8/2007 | Sandhu et al. |
| 2007/0211659 A1 | 9/2007 | Li et al. |
| 2007/0249324 A1 | 10/2007 | Jou |
| 2007/0287450 A1 | 12/2007 | Yang |
| 2007/0294528 A1 | 12/2007 | Shoji et al. |
| 2008/0119165 A1 | 5/2008 | Mittal et al. |
| 2008/0307515 A1 | 12/2008 | Drokov et al. |
| 2009/0013210 A1 | 1/2009 | McIntosh et al. |
| 2009/0092255 A1 | 4/2009 | Jou |
| 2009/0193118 A1 | 7/2009 | Cox et al. |
| 2011/0055898 A1 | 3/2011 | Jou |
| 2011/0271111 A1 | 11/2011 | Frank et al. |
| 2011/0281609 A1 | 11/2011 | Kuo |
| 2012/0278654 A1 | 11/2012 | Shen |

FOREIGN PATENT DOCUMENTS

| | | |
|---|---|---|
| EP | 0 352 787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 638 261 | 3/2006 |
| EP | 1 724 691 | 11/2006 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| WO | WO0184323 | 11/2001 |
| WO | WO 02/25967 | 3/2002 |
| WO | WO 03/079484 | 9/2003 |

OTHER PUBLICATIONS

PCT Application No. PCT/US2007/09836, International Search Report and Written Opinion Sep. 12, 2008.

PCT Application No. PCT/US2007/09503, International Search Report and Written Opinion Mar. 3, 2008.

PCT Application No. PCT/US2012/036028, International Search Report and Written Opinion Aug. 7, 2012.

Chinese Office Action for CN Application No. 200680045272.7 mailed Jul. 12, 2011.

Chinese Office Action for CN Application No. 200680045272.7 mailed Feb. 1, 2011.

Chinese Office Action for CN Application No. 200680045272.7 mailed Jul. 15, 2010.

Chinese Office Action for CN Application No. 200780019074.8 mailed Jun. 15, 2011.

Chinese Office Action for CN Application No. 200780019389.2 mailed Sep. 12, 2012.

Chinese Office Action for CN Application No. 200780019389.2 mailed Apr. 8, 2011.

European First Examination Report for EP Application No. 068387133 mailed Apr. 3, 2012.

European First Examination Report for EP Application No. 07755678.5 dated Oct. 23, 2012.

U.S. Appl. No. 13/461,679, Office Action mailed Apr. 1, 2013.

Aboba, Bernard "Virtual Access Points," IEEEP802.11 Wireless LANs, XX, XX, No. 802.11-03/154r1, May 22, 2003.

Areg Alimian et al., "Analysis of Roaming Techniques," doc.:IEEE 802.11-04/0377r1, Submission, Mar. 2004.

Chang, Nicholas B. et al., "Optimal Channel Probing and Transmission Scheduling for Opportunistics Spectrum Access," Sep. 2007.

Cisco Systems, "Cisco Aironet Access Point Software Configuration Guide: Configuring Filters and Quality of Service," Aug. 2003.

Dell Inc., "How Much Broadcast and Multicast Traffic Should I Allow in My Network," PowerConnect Application Note #5, Nov. 2003.

Dunkels, Adam et al., "Connecting Wireless Sensornets with TCP/IP Networks," Proc. of the 2d Int'l Conf. on Wired Networks, Frankfurt, Feb. 2004.

Dunkels, Adam et al., "Making TCP/IP Viable for Wireless Sensor Networks," Proc. of the 1st Euro. Workshop on Wireless Sensor Networks, Berlin, Jan. 2004.

Dutta, Ashutosh et al., "MarconiNet Supporting Streaming Media Over Localized Wireless Multicast," Proc. of the 2d Int'l Workshop on Mobile Commerce, 2002.

Festag, Andreas, "What is MOMBASA?" Telecommunication Networks Group (TKN), Technical University of Berlin, Mar. 7, 2002.

Golmie, Nada, "Coexistence in Wireless Networks: Challenges and System-Level Solutions in the Unlicensed Bands," Cambridge University Press, 2006.

Hewlett Packard, "HP ProCurve Networking: Enterprise Wireless LAN Networking and Mobility Solutions," 2003.

Hirayama, Koji et al., "Next-Generation Mobile-Access IP Network," Hitachi Review vol. 49, No. 4, 2000.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.

Information Society Technologies Ultrawaves, "System Concept/Architecture Design and Communication Stack Requirement Document," Feb. 23, 2004.

Keidl et al., TES2003, LNCS v. 2819, pp. 104-118, Sep. 2003.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Mawa, Rakesh, "Power Control in 3G Systems," Hughes Systique Corporation, Jun. 28, 2006.

Microsoft Corporation, "IEEE 802.11 Networks and Windows XP," Windows Hardware Developer Central, Dec. 4, 2001.

Pat Calhoun et al., "802.11r strengthens wireless voice," Technology Update, Network World, Aug. 22, 2005, http://www.networkworld.com/news/tech/2005/082208techupdate.html.

Steger, Christopher et al., "Performance of IEEE 802.11b Wireless LAN in an Emulated Mobile Channel," 2003.

(56) References Cited

OTHER PUBLICATIONS

Toskala, Antti, "Enhancement of Broadcast and Introduction of Multicast Capabilities in RAN," Nokia Networks, Palm Springs, California, Mar. 13-16, 2001.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Vincent D. Park, et al., "A Performance Comparison of the Temporally-Ordered Routing Algorithm and Ideal Link-State Routing," IEEE, Jul. 1998, pp. 592-598.
Wennstrom, Mattias et al., "Transmit Antenna Diversity in Ricean Fading MIMO Channels with Co-Channel Interference," 2001.
Extended European Search Report for EP application No. 07755678.5 mailed Dec. 29, 2011.
Chinese Office Action for CN application No. 200780019389.2 mailed Feb. 27, 2012.
Extended European Search Report for EP application No. 06838713.3 mailed Jul. 13, 2011.
U.S. Appl. No. 11/607,619, Office Action mailed Oct. 13, 2010.
U.S. Appl. No. 11/607,619, Final Office Action mailed Dec. 4, 2009.
U.S. Appl. No. 11/607,619, Office Action mailed Apr. 29, 2009.
U.S. Appl. No. 11/788,371, Final Office Action mailed Jan. 21, 2010.
U.S. Appl. No. 11/788,371, Office Action mailed Sep. 17, 2009.
U.S. Appl. No. 11/789,446, Final Office Action mailed Oct. 13, 2010.
U.S. Appl, No. 11/789,446, Office Action mailed May 24, 2010.
U.S. Appl. No. 11/789,446, Final Office Action mailed Jun. 24, 2009.
U.S. Appl. No. 11/789,446, Office Action mailed Sep. 3, 2008.
U.S. Appl. No. 12/339,688, Office Action mailed Sep. 15, 2009.
U.S. Appl. No. 12/845,089, Final Office Action mailed Feb. 14, 2012.
U.S. Appl. No. 12/845,089, Office Action mailed Sep. 6, 2011.
U.S. Appl. No. 13/191,383, Office Action mailed Jul. 22, 2013.
U.S. Appl. No. 13/461,679, Final Office Action mailed Oct. 25, 2013.

DYNAMIC AUTHENTICATION IN SECURED WIRELESS NETWORKS

CROSS-REFERENCE TO RELATED APPLICATIONS

The present application is a continuation and claims the priority benefit of U.S. patent application Ser. No. 12/845,089 filed Jul. 28, 2010, which is a continuation and claims the priority benefit of U.S. patent application Ser. No. 11/788,371 filed Apr. 18, 2007, which claims the priority benefit of U.S. provisional patent application No. 60/794,625 filed Apr. 24, 2006 and U.S. provisional patent application No. 60/796,845 filed May 2, 2006. The disclosure of the aforementioned applications is incorporated herein by reference.

BACKGROUND OF THE INVENTION

1. Field of the Invention

The present invention generally relates to information network security. More specifically, the present invention relates to user-friendly, low-maintenance authentication for secured wireless networks.

2. Description of the Related Art

A variety of user authentication and security measures for wireless networks have been proposed by a number of professional organizations. These professional organizations include the Institute of Electrical and Electronics Engineers (IEEE) 802.11 Working Group, the Wi-Fi Alliance, and the Internet Engineering Task Force (IETF). Implementing these proposals has generally been complicated, difficult to maintain, and requires a high level of technical knowledge by those implementing a particular proposal. Many commercial organizations (e.g., small- and medium-sized businesses), therefore, have been unable to deploy such measures, because of their lack of expertise and/or full-time professional technical support.

In early wireless networks (e.g., IEEE 802.11 or Wi-Fi), security was achieved by wired equivalent privacy (WEP) systems. Deploying a WEP system requires only that a network administrator define a WEP key set at an access point or access device. Any user can access a WEP-secured wireless network by having the same WEP key set manually configured on that user's client station (e.g., a laptop or mobile device). The wireless data communication between the client station and the access point would be encrypted by a defined encryption algorithm utilizing the shared WEP key set.

While WEP may work to prevent casual trespassers from accessing the wireless network, WEP would not likely withstand more serious security attacks. WEP keys can be easily discovered, for example, by using publicly available software. Further, WEP does not work to protect network users from each other since all users share the same key. Because of these flaws in WEP-based security systems, alternative security measures evolved. These new measures generally required that wireless network users first be authenticated in some manner and that a key set then be derived and used for wireless traffic encryption. These proposed authentication measures can generally be categorized into two groups: Extensible Authentication Protocol (EAP) and Pre-Shared Key (PSK).

The EAP group of security measures generally follows the IEEE 802.1x standard, which utilizes the extensible authentication protocol. EAP-based security systems enable mutual authentication between an authentication server and its users. The authentication server may reside in an access point, base station or an external device. Generally, the authentication server provides for a derived pair-wise master key to be shared between an access point and the user client station. That pair-wise master key may be used to derive a key set, which may be used for data encryption.

A major obstacle in implementing EAP or IEEE 802.1x-based security systems is their complexity. Deploying such systems requires a high level of technical expertise, as well as ongoing technical support for users. Most EAP-based systems, for example, require security certificates to be installed onto authentication servers. Depending on the exact requirements of the EAP-based system, the client stations may also need to be granted the authority to root certificate updates and/or have the security certificate pre-installed before access to the wireless network can be granted.

In contrast, PSK security systems are based on a secret shared between and stored at both the client station and the access point. The secret may be, for example, a long bit stream, such as a passphrase, a password, a hexadecimal string, or the like. Used by a client station and the access point to authenticate each other, the secret may also be used to generate an encryption key set.

A major shortcoming of PSK-based systems is that the secret has to be manually entered onto client stations and shared by all the client stations. Once the shared secret becomes known to unauthorized personnel, the security of the entire network is compromised. This may pose a problem in organizations that need to provide network access to temporary employees or that have a highly mobile workforce. To maintain the security of a PSK-based system, the secret must be changed on all client stations whenever a person with knowledge of the secret departs from the organization or is no longer authorized to access the network.

Notwithstanding the many measures available for securing a wireless network, implementing any one of these measures may be complicated, difficult, and/or require extensive maintenance. There is, therefore, a need in the art for improved systems and methods that provide security for wireless networks that are user-friendly and easily maintained without requiring a high degree of technical expertise and ongoing technical support.

SUMMARY OF THE CLAIMED INVENTION

Exemplary systems and methods of the present invention provide for pairing dynamic secrets in secured wireless networks. A random secret is generated for each authenticated user. That secret is unique to the user, and no other users in the network may use that secret to access the network. Further, the secret is associated, or bound, with the wireless interface belonging to the user, so that no other wireless interface belonging to other users may use that secret to access the network.

Various embodiments of the present invention include methods for pairing such dynamic secrets. Associating the secret with a wireless interface may occur immediately after the secret is generated and/or associated with the access profile, or associating the secret with the wireless interface may occur after a delay. Some embodiments associate the secret with the wireless interface by generating an executable to configure the wireless interface to access the wireless network. Configuration may include transferring a copy of the executable to the wireless interface, along with copies of the secret, any security keys derived from the secret, and the user's access profile. Various embodiments of the present invention further include updating the secret, which requires that the wireless interface be reauthenticated before being allowed to reconnect or continue its connection to the wireless network.

Embodiments of the present invention include systems for pairing dynamic secrets in a secured wireless network. Such systems may include a secret generation module, a binding module, and a secret database. The secret is generated by the secret generation module and associated (bound) with a wireless interface by the binding module. The secret database stores information concerning secrets, associations with user profiles, associations with wireless interfaces, and the like. Some embodiments further include an access profile generation module, an executable generation module, and the like. The access profile generation module generates access profiles for users. The executable generation module generates executables for configuring wireless interfaces for access to wireless networks.

Some embodiments of the present invention include computer media and instructions for pairing dynamic secrets in a secured wireless network. Some embodiments further include instructions for updating the secrets and requiring that wireless interfaces be reauthenticated.

DETAILED DESCRIPTION

The present invention includes systems and methods for using user-friendly, low-maintenance authentication in secured wireless networks through the use of dynamic secrets. Paired secrets are shared between a client station and an access point. These secrets are dynamically generated for each authenticated user and associated with the user's access profile. The secret may also be associated with a specific client station or wireless interface belonging to the user. In some embodiments of the present invention, the secret expires, at which point the user must reauthenticate in order to continue accessing the wireless network.

Figure 1:
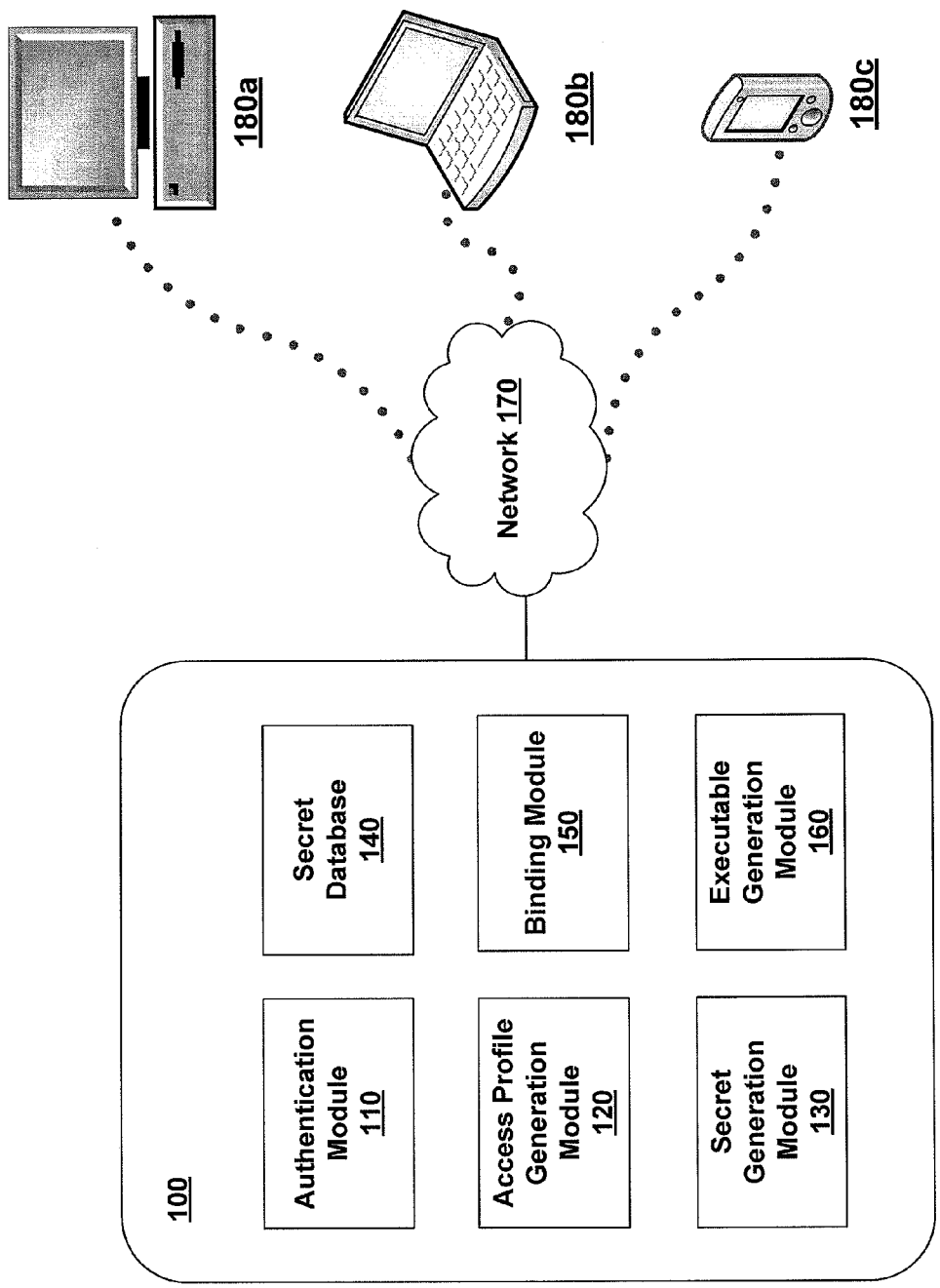
FIG. 1 is an illustration of an authentication system for a secured wireless network in accordance with an exemplary embodiment of the present invention.

FIG. 1 is an illustration of an authentication system 100 for a secured wireless network 170 in accordance with an exemplary embodiment of the present invention. Authentication server 100, as illustrated in FIG. 1, includes an authentication module 110, an access profile generation module 120, a secret generation module 130, a database of secrets 140, a binding module 150, and an executable generation module 160. The authentication server 100 may be used to maintain security in network 170. Various client devices, such as wireless workstation 180a, laptop 180b, and mobile device 180c belong to potential users of network 170.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component.

Authentication module 110 authenticates a user (e.g., laptop 180b) and verifies that the user is who they purport to be and that they are otherwise authorized to access network 170. The authentication module 110 may be used to verify a user name and password supplied by the user. Verification may occur through comparison with user names and passwords stored in an authentication database, which may be independent of or incorporated into authentication module 110. In some embodiments, the authentication database may be integrated with secret database 140 as is described below. Once authenticated by authentication module 110, the user may access data and perform actions within network 170 based on the user's security clearance level, the parameters of the user's role in the organization, as defined by a network administrator, and as may be further governed by a paired secret or derived keys.

Access profile generation module 120 generates an access profile for a user authenticated by authentication module 110. A user access profile may include, at the least, a random paired secret and an executable as is further described herein. An access profile may further include information concerning the user, such as authentication information, security information, user preferences, and the like. To access the network 170, a user copies, downloads, or otherwise transfers the user access profile to the user's client device (e.g., laptop 180b). Access profiles may be securely obtained via a common web browser utilizing hypertext transfer protocol over secure socket layer (HTTPS). The executable automatically configures a wireless device so that they may access the wireless network 170.

Secret generation module 130 generates a random secret for each user. Various algorithms and formulas may be used by secret generation module 130 to randomly generate secrets. By providing for random secrets, secret generation module 130 increases the difficulty for potential trespassers to deduce or otherwise determine a particular secret and illicitly gain access to network 170. Secret generation module 130 is further configured to determine that each secret is unique to each user, so that each secret may only be used by one user. The secret may be bundled as part of an access profile. The secret will be used to authenticate a wireless device so that the wireless device can access the wireless network 170. In some embodiments, secret generation module 130 may derive from a particular secret a set of one or more security keys for a user. Like secrets, security keys may be associated with a wireless device and used in configuring the wireless interface so that it may access the wireless network 170. Also like secrets, no other wireless device may then use those same security keys to access the network 170.

Secret database 140 stores information concerning various secrets generated by secret generation module 130. Secret database 140 may also store information concerning which user is associated with a particular secret, any security keys derived from a secret, which wireless device, if any, is associated with a user's secret or security keys, and the like. Secret database 140 may further store information concerning user names, passwords, security clearance levels, and the like. Secret database 140 may operate in conjunction with authentication module 110 to authenticate users and interfaces belonging to the users to the network 170.

Binding module 150 is configured to associate (bind) a user's secret to a wireless interface device belonging to the user (e.g., workstation 180a, laptop 180b, or mobile device 180c). The association formed by binding module 150 between a secret and a user's wireless interface device is required for the wireless interface to be authenticated and allowed access to the wireless network 170. In some instances, immediately after secret generation and/or association with an access profile, binding module 150 associates the user's secret to the user's wireless interface device (if the user is using a wireless interface device) or a profile assigned to the interface device. The immediate operation of binding module 150 may be referred to as prompt binding. Alternatively, the operations of binding module 150 may be delayed until the user initiates the first wireless connection via the wireless interface and the MAC address of the user's wireless device may be determined. The delayed operation of binding module 150 may be referred to as delayed binding.

An executable generation module 160 generates an executable application that configures a wireless interface for access to the wireless network 170. The executable generated by executable generation module 160 may then be copied, downloaded, or otherwise transferred to a wireless interface belonging to the user. The executable may be bundled as part of an access profile. The executable installs the access profile generated by access profile generation module 120 and the secret generated by secret generation module 130 onto the wireless device. Generation of this executable and the aforementioned access profile are further disclosed in U.S. provisional patent application 60/796,845, the disclosure of which has been previously incorporated by reference.

Network 170 may be configured to transmit various electromagnetic waves, including, for example, radio signals. Network 170 may be an IEEE 802.11 (Wi-Fi or Wireless LAN) network, IEEE 802.16 (WiMAX) network, IEEE 802.16c network, or the like. Network 170 may convey various kinds of information to interface devices, such as client interface devices 180a-c. Network 170 may be a local, proprietary network or may be a part of a larger wide-area network. Various subsidiary networks may reside within the realm of greater network 170 such as peer-top-peer or wireless mesh networks.

Client interface devices 180a-c illustrate a variety of wireless-capable interfaces, including desktop computers, laptop computers, handheld computers, and the like. A user wishing to access the wireless network 170 through wireless interface 180a, for example, may do so by copying, downloading, or otherwise transferring to wireless interface 180a a copy of the user's access profile generated by access profile generation module 120, a secret generated by secret generation module 130, and an installation executable generated by executable generation module 160. The executable configures wireless interface 180a so that wireless interface 180a can access the wireless network 170 utilizing an access profile and paired secret as part of an overall authentication operation. Wireless interface 180b and wireless interface 180c may be configured in similar fashion.

A user's secret may be updated periodically or in response to a request by a network administrator. A new secret may be generated for the user by secret generation module 130, associated with the user's access profile, and saved to the secret database 140. If the previous secret has expired, the wireless interface must be reauthenticated. The user must either reauthenticate immediately or reauthenticate at the next wireless connection. Reauthenticating the wireless device may include reauthenticating the user, transferring copies of the user's new secret, access profile, and/or a new executable, and, using binding module 140, forming a new association between the wireless interface and the new secret.

Figure 2:
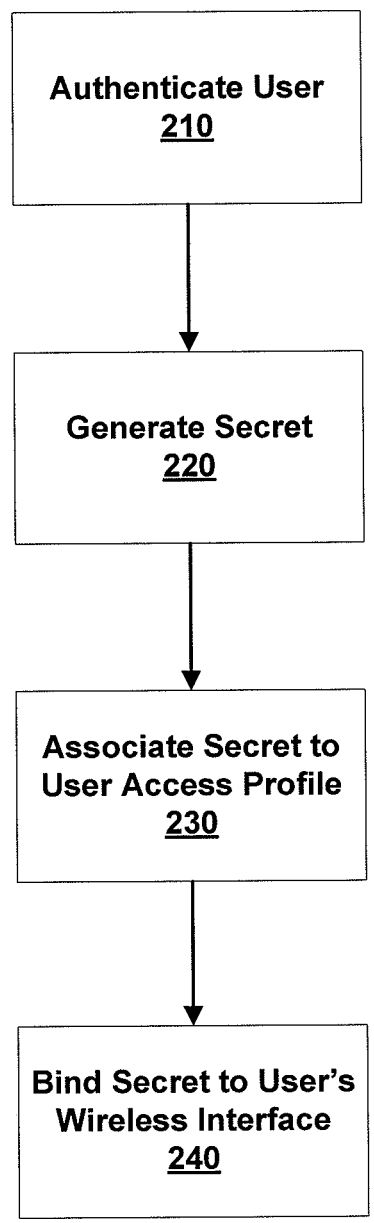
FIG. 2 is a flowchart illustrating a method for using paired secrets in a secured wireless network.

FIG. 2 is a flowchart illustrating a method 200 for using paired secrets in a secured wireless network 170. In method 200, a user is authenticated, a random and unique paired secret is generated for the user, the secret is associated with an access profile belonging to the user, and the secret is further associated (bound) with a wireless interface belonging to the user and further associated with a particular access profile.

In step 210, the user is authenticated using authentication module 110. Initial authentication may include providing a user name and password identifying the user as a particular user. That user may or may not be authorized to access the network 170 as may be determined with respect to paired secrets. If a user cannot be authenticated through a simple user name and password match (or subsequently with respect to paired secrets), the user may not be allowed to access the wireless network 170.

In step 220, a secret is generated for the provisionally authenticated user. Generated by secret generation module 130, the secret may be determined through various algorithms or formulas so that a randomly generated secret is produced for the authenticated user. Further, the secret is unique to each user in the network 170. The uniqueness of the secret for each user provides each user protection from all other users in the network 170. Because each user has a secret uniquely bound to that specific user (or their profile and/or interface device), there is no way for a user to use another user's secret. Further, when a particular user is no longer authorized to use the network 170, that user's de-authorization does not affect the ability of other users to continue using the network 170 as is the case in many prior art network security solutions. Further, deauthorization of a particular user does it require any particular technical expertise or technical support to maintain the security of the network 170. Also in step 220, other information entities associated with the wireless authentication mechanism, such as authority certificates, may be generated.

In step 230, the secret generated for an authenticated user is associated with that user's access profile, which may be further associated with a particular interface device. Information concerning the association between the secret and the user access profile may be saved in secret database 150.

In step 240, the secret is associated (bound) with a wireless interface belonging to the authenticated user, their profile, and/or device. The association may be formed by binding module 140 and allows the wireless interface device to access the wireless network 170. The association, or binding, may include downloading an access profile, a paired secret and associated derived security keys, and an executable for configuring and associating the wireless interface device with the secret. The secret may be associated with the wireless interface by associating the secret with a specific radio of the wireless interface, a MAC address of the wireless interface, or the like. Information concerning the association between the paired secret and wireless interface may be saved in secret database 150.

Figure 3:
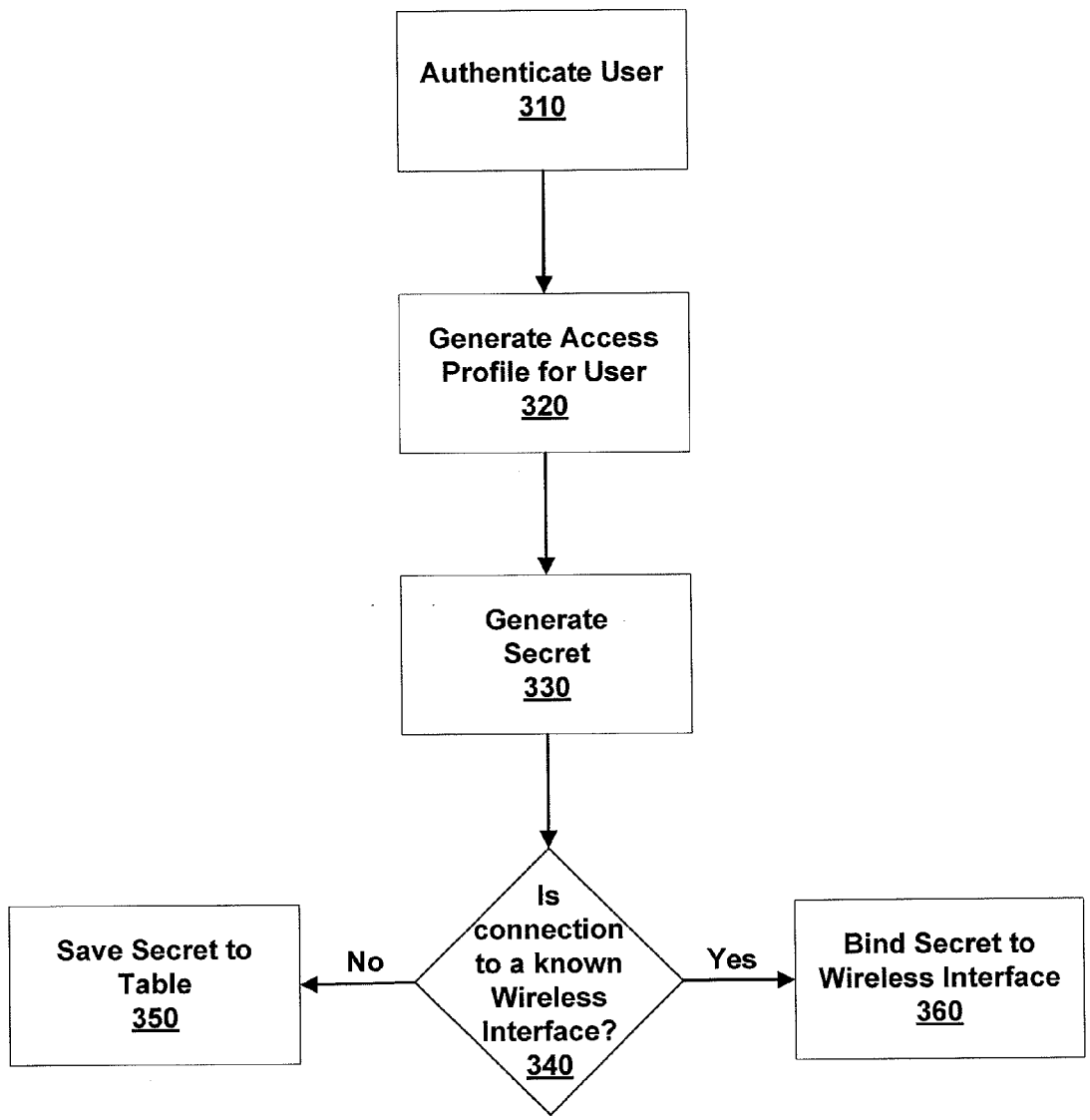
FIG. 3 is a flowchart illustrating an alternative method for using paired secrets in a secured wireless network.

FIG. 3 is a flowchart illustrating an alternative method 300 for using secrets in a secured wireless network 170. In this method 300, the user is authenticated as may occur through an initial user name and password verification process, an access profile is generated, and a secret is generated. If a known wireless interface is connected to the network 170, then that wireless interface is associated (bound) with the secret. If there is no known wireless interface currently connected to the network 170, then the unassociated secret may be saved and can be later associated with a wireless interface.

In step 310, the user is authenticated by authentication module 110. The authentication may be performed in a similar fashion to the authentication performed in step 210.

In step 320, an access profile is generated for the authenticated user. The access profile, generated by access profile generation module 120, may be used to configure a wireless interface belonging to the user so that they may access the network 170.

In step 330, a secret is generated for the user. The generation of the secret may be performed in a manner similar to that of step 220 of FIG. 2.

In step 340, the determination is made whether the current network connection is through a known wireless interface. The determination may be based on authentication information, user input, or the like.

In step 350, where the connection is (for example) determined not to be a known wireless interface already having a bound secret, the most recently generated secret is saved to a table. The table may be included in secret database 150. Where the user is not using a wireless interface, the wireless interface is not the intended interface to be used in a multi-wireless-interface (radio) device, the user is not using the user's own wireless interface, or the user is otherwise not ready to associate the wireless interface with the secret, the secret may be saved to the table for later use.

In step 360, where the connection is determined to be a known wireless interface not having a bound secret, having an expired secret, or otherwise in need of a bound secret, the secret is bound with the wireless interface. The association may be formed in a similar manner as the association formed in step 240.

Figure 4:
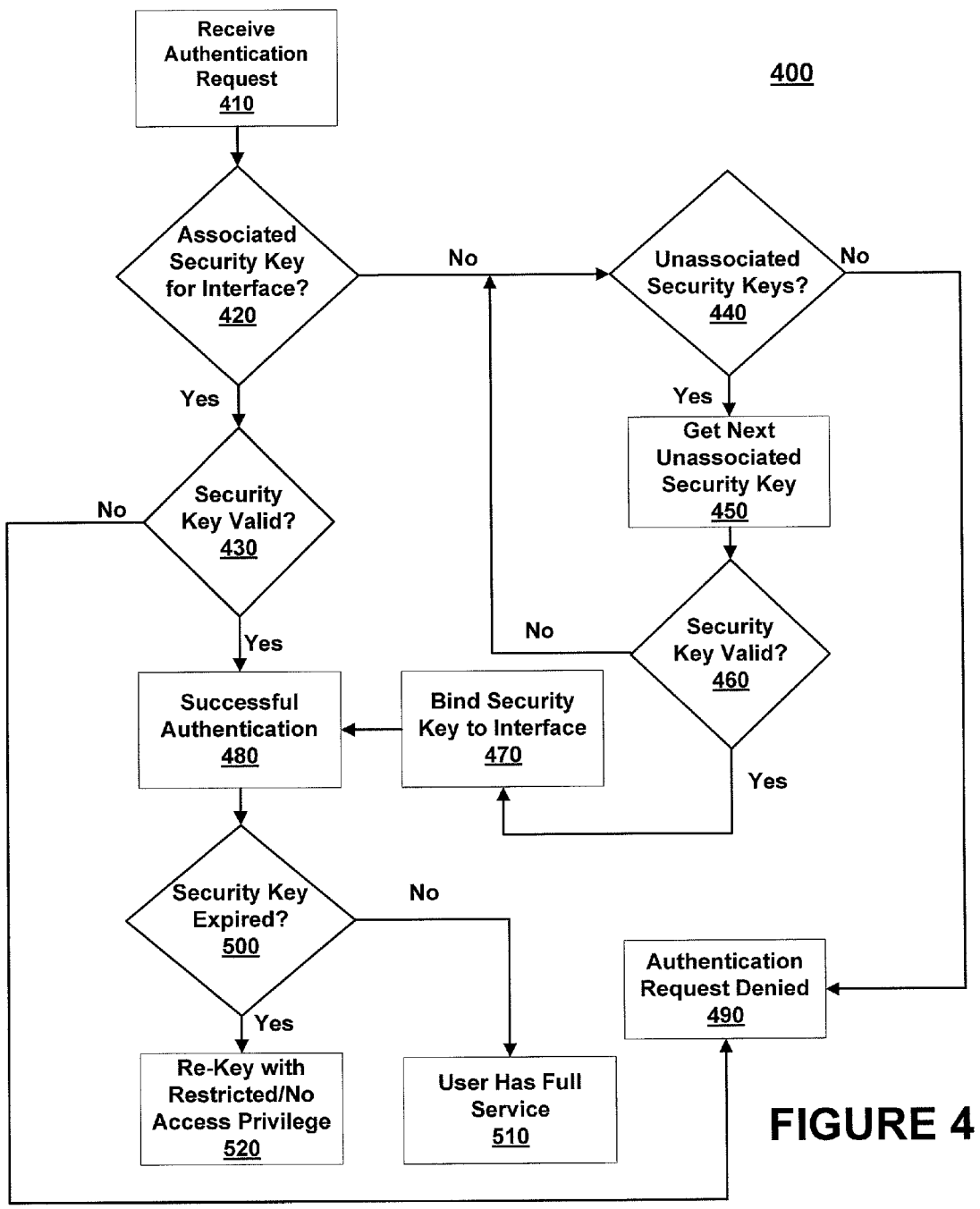
FIG. 4 is a flowchart illustrating a method for using security keys in a secured wireless network.

FIG. 4 is a flowchart illustrating a method 400 for using security keys in a secured wireless network 170. In this method, an authentication request is received from a wireless interface. It is then determined whether a security key is associated with the interface, and if so, it is determined whether the security key is valid. If the security key is valid, then the wireless interface is successfully authenticated. If the security key is not valid, the authentication request is denied. If there is no security key associated with the interface, it is determined whether there are any unassociated security keys for the user. If there are unassociated security keys, then the next unassociated security key is obtained. It is then determined whether the security key is valid. If the security key is not valid, it is determined again whether there are any unassociated security keys. If there are no unassociated security keys left, the authentication request is denied. If there is an available unassociated security key and it is valid, then the security key is bound to the interface, and the wireless interface is successfully authenticated.

In step 410, an authentication request is received from a wireless interface belonging to a user. This request may occur when the wireless interface is new to the network 170, for wireless interfaces whose security key has expired, for wireless interfaces whose connection was terminated, or the like.

In step 420, it is determined whether there is a security key associated with the wireless interface. The determination may be made from information in the wireless interface authentication process. If there is an associated security key, the method proceeds to step 430. If there is no associated security key, the method proceeds to step 440.

In step 430, where the security key is determined to be associated with the wireless interface, it is then determined whether that security key is valid. The determination may be made by comparing the security key information from the authentication request with the security key in secret database 150.

In step 440, where there is no security key associated with the wireless network 170, it is determined whether there are any unassociated security keys for the user. The determination may be made based on information from the authentication request, security key information associated with the user access profile saved in secret database 150, and the like. If there is an unassociated security key available, the method proceeds to step 450. If there are no unassociated security keys available, the method proceeds to step 490.

In step 450, where it was determined that there are unassociated security keys available, the next unassociated security key is obtained. All unassociated security keys are saved to a table, as described in step 350. In some embodiments, the table is included in secret database 150. In step 450, the next available unassociated security key from the table is considered.

In step 460, it is determined whether the security key under consideration is valid. The determination of whether the security key is valid is similar to the determination made in step 430. If the security key is not valid, the method returns to step 440. If the security key is valid, the method proceeds to step 470.

In step 470, the security key is bound to the wireless interface. The binding, or association, is formed similarly to the association formed in steps 240 and 360.

In step 480, the authentication of the wireless interface by security key is successful. In some embodiments, the method may proceed with further authentication steps. For example, in step 500, a determination may be made as to whether the security key has expired. If the key has expired, a re-keying process may commence in step 520. In the interim, however, the user may be subjected to restricted access or no access whatsoever. In some embodiments, the re-keying process may be a part of a different process while the user has limited or no access privileges. If they key is still valid, however, the user may enjoy full service access in step 510. Authenticating the wireless interface, however, allows the wireless interface to access the wireless network 170.

In step 490, the authentication request is denied. The wireless interface is not allowed to access the wireless network 170, or if there is an existing connection, it may be terminated.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for enabling access to a secured wireless network, the method comprising:
   storing information in memory regarding a plurality of users authorized to access the secured wireless network;
   receiving an authentication request from a wireless device; and
   executing instructions stored in memory, wherein execution of instructions by a processor:
      authenticates a requesting user of the wireless device as one of the users authorized to access the secured wireless network,
      generates a security key to be associated with the wireless device-used by the requesting user, wherein the security key is derived from a secret unique to the requesting user; and
      processes subsequent access requests from the requesting user of the wireless device, wherein the wireless device is granted access to the secured wireless network following a determination that the security key is valid and has not expired.

2. The method of claim 1, wherein the unique security key is based on a unique secret associated with the requesting user.

3. The method of claim 2, further comprising generating a plurality of other unique security keys based on the unique secret and storing the plurality of other unique security keys in memory.

4. The method of claim 3, further comprising receiving another authentication request from the requesting user using another wireless device and associating the other wireless device with one of the plurality of other unique security keys.

5. The method of claim 2, wherein the unique secret expires and further comprising re-authentication before associating a new unique secret with the wireless device.

6. The method of claim 5, wherein the new unique secret is generated periodically.

7. The method of claim 5, wherein the new unique secret is generated in response to a request by a network administrator.

8. The method of claim 5, wherein expiration includes terminating a connection to the wireless device.

9. The method of claim 1, further comprising generating an executable for the wireless device, wherein execution of the executable at the wireless device binds the unique security key with the wireless device.

10. A system for enabling access to a secured wireless network, the system comprising:
- an authentication database for storing information regarding a plurality of users authorized to access the secured wireless network;
- a network interface for receiving an authentication request from a wireless device; and
- a processor for executing instructions and modules stored in memory, wherein the processor executes:
  - an authentication module to authenticate a requesting user of the wireless device as one of the users authorized to access the secured wireless network,
  - a secret generation module to generate a security key to be associated with the wireless device used by the requesting user, wherein the security key is derived from a secret unique to the requesting user; and
  - authentication server instructions to process subsequent access requests from the requesting user of the wireless device, wherein the wireless device is granted access to the secured wireless network following a determination that the security key is valid and has not expired.

11. The system of claim 10, further comprising a binding module for associating the wireless device with the unique security key.

12. The system of claim 10, wherein the unique security key is based on a unique secret associated with the requesting user.

13. The system of claim 12, wherein the processor further executes the secret generation module to generate a plurality of other unique security keys based on the unique secret and storing the plurality of other unique security keys in memory.

14. The system of claim 13, wherein the network interface receives another authentication request from the requesting user using another wireless device and further comprising a binding associating the other wireless device with one of the plurality of other unique security keys.

15. The system of claim 12, wherein the unique secret expires and wherein the authentication server requires re-authentication before associating a new unique secret with the wireless device.

16. The system of claim 5, wherein the secret generation module generates the new unique secret periodically.

17. The system of claim 15, wherein the secret generation module generates the new unique secret in response to a request by a network administrator.

18. The system of claim 15, wherein expiration includes termination of a connection to the wireless device.

19. The system of claim 10, further comprising an executable generation module for generating an executable for the wireless device, wherein execution of the executable at the wireless device binds the unique security key with the wireless device.

20. A non-transitory computer-readable storage medium, having embodied thereon a program executable by a processor to perform a method for enabling access to a secured wireless network, the method comprising:
- storing information regarding a plurality of users authorized to access the secured wireless network;
- receiving an authentication request from a wireless device;
- authenticating a requesting user of the wireless device as one of the users authorized to access the secured wireless network;
- generating a security key to be associated with the wireless device-used by the requesting user, wherein the security key is derived from a secret unique to the requesting user; and
- processing subsequent access requests from the requesting user of the wireless device, wherein the wireless device is granted access to the secured wireless network following a determination that the security key is valid and has not expired.

* * * * *